C. H. STAHL & H. C. JOHNSON.
COMBINATION REAMER AND DIE.
APPLICATION FILED OCT. 11, 1915.
1,285,074.  Patented July 31, 1917.
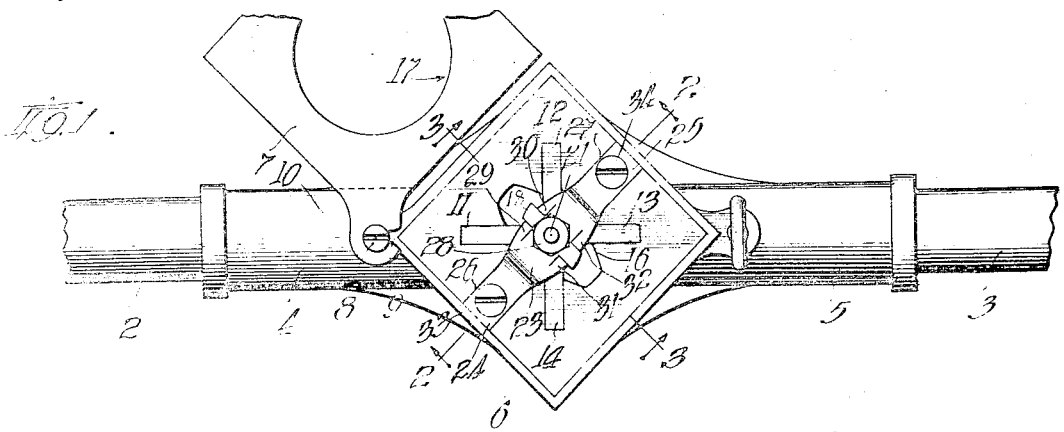
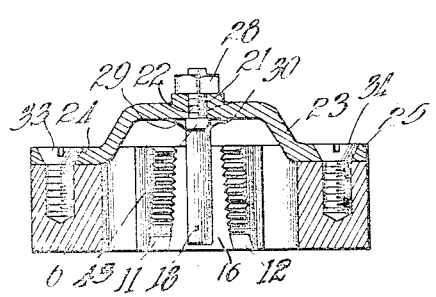 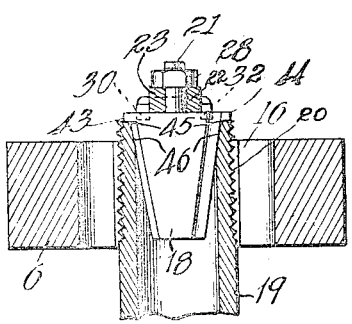
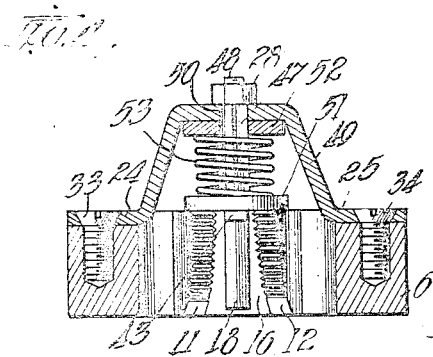 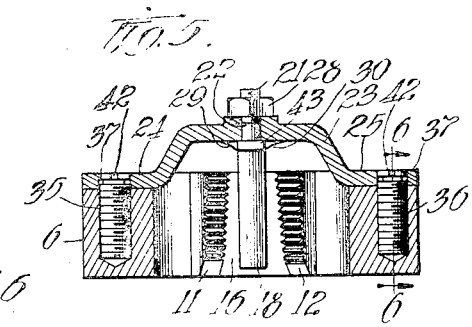
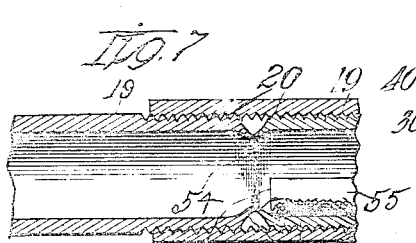 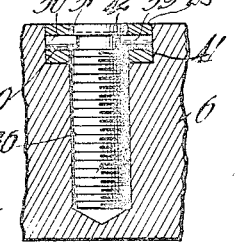
Witnesses
Harry B. White
W. F. Kilroy
Inventors
Carl H. Stahl,
Herman C. Johnson,
By J. Warner Dockstrom, Atty.

UNITED STATES PATENT OFFICE.

CARL H. STAHL AND HERMAN C. JOHNSON, OF CHICAGO, ILLINOIS.

COMBINATION REAMER AND DIE.

1,235,074. Specification of Letters Patent. Patented July 31, 1917.

Application filed October 11, 1915. Serial No. 55,158.

*To all whom it may concern:*

Be it known that we, CARL H. STAHL and HERMAN C. JOHNSON, subjects of the King of Sweden, residing at Chicago, in the county of Cook and State of Illinois, have invented certain new and useful Improvements in Combination Reamers and Dies, of which the following is a specification.

Our invention relates to piping work, and has particular reference to the cutting, threading and reaming the ends of pipes which are used as conduits for electric light wiring. The object of the invention is to overcome the common difficulty in connection with this work of obstructions to the wires due to an annular bur formed in pipe ends when pipes are cut, tapped and connected together, due to the fact that plumbers, electricians and other artisans forget to ream out the ends of the pipes before or after they have been cut into proper lengths. And the particular object of the invention is to equip the thread cutting die with a reaming device which automatically reams out and dresses properly the end of the pipe at the same time that it is being threaded, thus not only preventing oversight of this work, but saving a great deal of mechanics' time.

With these objects in view the invention consists in the novel construction, combination and arrangement of parts, all as hereinafter described in detail, illustrated in the accompanying drawing, and incorporated in the appended claims.

In the drawing—

Figure 1 is a top plan view of an ordinary die stock to which our invention has been applied, the top plate being open and partly broken away.

Fig. 2 is a section taken substantially on line 2—2 of Fig. 1 with the parts 7, 8 omitted.

Fig. 3 is a section taken substantially on line 3—3 of Fig. 1, and including a section of pipe threaded and reamed at one operation, the usual cover parts 7, 8 being removed to more clearly illustrate the present improvement.

Fig. 4 is a modification wherein the reamer is yieldingly mounted with a stiff spring resistance and wherein a higher supporting arch is provided for the reamer.

Fig. 5 is a modification showing means for adjusting the reamer toward or away from the die to vary the distance that the pipe threads may be extended.

Fig. 6 is an enlarged section taken on line 6—6 of Fig. 5.

Fig. 7 is a longitudinal section of two connected pipe sections showing the obstructing flange, rim or bur and the end of a wire meeting such obstruction.

Fig. 8 is similar to Fig. 7, with finishing produced by our invention.

In the several views 2 and 3 represent broken off handles held in sockets 4 and 5 of a common form of die stock having the usual die holder or casing 6 provided with the usual cover 7 pivotally mounted on the usual headed pivot 8 onto which the cover 7 is threaded through a slot 9 in a pivot lug 10 of said cover. The cover holds the bits or thread cutters against vertical displacement in the holder 6. The details of the die holding device are the usual construction with the exception of the slot 9, and may be varied in numerous ways. 11, 12, 13, 14 are the usual thread cutters in a holder 6 in which 16 is the opening for the pipe or rod to be threaded. An opening 17 for the same purpose is provided in the cover, the parts of the cover around its opening serving to hold the die and its cutters against displacement during a threading operation.

In our invention a reamer 18 of any suitable or preferred design is mounted in the opening 16 so as to enter the interior of a pipe 19 while threads 20 are being cut thereupon. The reamer 18 has on its upper end a threaded stud or bolt portion 21 which engages a hole 22 in a bracket, cross-piece or die-support 23 the body of which is raised or arched and constructed to pass through the opening 17 of the cover 7. Ends 24 and 25 of the holder 23 are seated in slots 26 and 27 in the upper face of the die and arranged to have their upper faces even or flush with said upper face, as shown in the several views, so as to form no obstruction to the ordinary cover shown in Fig. 1, when the latter is placed on the die in the usual way. The threaded nipple or stem 21 of the reamer 18 is provided with a nut 28 which holds the reamer in place on the arch 23. To prevent the reamer from turning during its operation struck out and downwardly projecting lugs 29, 30, 31, and 32 are formed on the arch 23. The body of the reamer, which is shown as a two-edged or flat piece of metal is held between these lugs which form two sets of stationary jaws for that purpose, as shown in Figs. 1, 2 and 3, The ends 24 and 25 in said figures are secured to the die by means of screws 33 and 34. In Fig. 5 these screws are modified as screws 35 and 36 each of which has an annular slot 37 which is engaged by the inner ends of a pair of pins 38 and 39 driven into bores 40 and 41 formed in the ends 24 and 25. Each screw is provided with a screw driver slot 42 and when the screws are turned outward or inward they, by reason of the pins 38 and 39 engaging the slots 37, carry the member 23, 24, 25 with them to vary its distance from the face of the die, or to vary the distance that a pipe end may be threaded or projected against the arch 23. As shown in Figs. 2, 3, 4, and 5 at the upper corners of the reamer blade 18 are a pair of pipe-end trimming cutters in the form of horizontally extending lugs 43 and 44 which produce the rounding off of the extreme end of the pipe indicated at 45 most plainly in Fig. 8. The beveled surfaces 46 are produced by the reamer proper.

In Fig. 4 the body of the reamer 18 is equipped with an elongated and squared shank 47 which takes the place of the threaded stud 21 in Figs. 1, 2, 3 and 5. The upper end of this shank has a threaded nipple 48 which receives the nut 28. In Fig. 4 the holder has a higher arch and is labeled 49 to distinguish it from the arch 23. A rectangular hole corresponding to the cross section of the shank 47 is provided for the latter in the arch 49, which prevents the reamer from turning. In the Fig. 4 modification the reamer is yieldingly mounted and is provided with a disk portion 51 against which and a washer 52 a stiff spring 53 bears with sufficient force to hold the reamer in normal position until the reaming operation is completed when the resistance of the spring is overcome to permit the cutters 43 and 44 to operate which the last portion of the reaming operation takes place.

In Fig. 7 54 represents the rough edge, bur or fringe on the end of a pipe against which the end 56 of a wire 55 will strike when being threaded past ends that have not been dressed, reamed or trimmed. In Fig. 8 is shown the same connected pipe ends as they appear after having been threaded by our improved threading and trimming tool. By adjustment of the reamer variation in the length of thread cutting on the pipe is made possible.

Having thus described our invention, we claim as new and desire to secure by Letters Patent—

1. The combination with a thread cutting die provided with an apertured cover for the passage of the end of a pipe to be threaded, of a reamer or trimmer support arranged in the aperture of said cover and free of attachment thereto and having supporting ends sunk into the face of the die, and a reamer mounted on said support and projecting centrally into the opening of said die.

2. The combination with a thread cutting die and its casing 6, of a supporting arch mounted on the casing 6 and extending across the opening of said casing, means for varying the distance at which said arch is supported over the face of the die, and a yieldingly mounted reamer on said support and projecting into the die opening.

In testimony whereof we have hereunto signed our names.

CARL H. STAHL.
HERMAN C. JOHNSON.